United States Patent [19]

Hashimoto et al.

[11] Patent Number: 4,532,165
[45] Date of Patent: Jul. 30, 1985

[54] POLY-1-BUTENE RESIN COMPOSITION

[75] Inventors: Takashi Hashimoto, Waki; Chikara Igarashi, Ohtake, both of Japan

[73] Assignee: Mitsui Petrochemical Industries Ltd., Tokyo, Japan

[21] Appl. No.: 492,750

[22] Filed: May 9, 1983

[51] Int. Cl.$^3$ .............................................. F16L 9/00
[52] U.S. Cl. ...................................... 428/36; 524/291; 524/342
[58] Field of Search .................. 524/291, 342; 428/36

[56] References Cited

U.S. PATENT DOCUMENTS

| 3,285,855 | 11/1966 | Dexter et al. | 524/304 |
| 3,310,575 | 3/1967 | Spivack | 252/49.7 |
| 3,531,483 | 9/1970 | Giles | |
| 3,856,726 | 12/1974 | Menzel et al. | 524/342 |
| 3,949,024 | 4/1976 | Beck et al. | 524/150 |
| 4,077,902 | 3/1978 | Moser et al. | |
| 4,143,099 | 3/1979 | Duncan | 524/291 |
| 4,248,594 | 2/1981 | Tucker et al. | 524/291 |

FOREIGN PATENT DOCUMENTS

| 0032627 | 7/1981 | European Pat. Off. | 524/291 |
| 0060673 | 9/1982 | European Pat. Off. | 524/291 |
| 47-9261 | 3/1972 | Japan | 524/291 |
| 54-125240 | 9/1979 | Japan | 524/291 |
| 56-149450 | 11/1981 | Japan | 524/291 |
| 945832 | 1/1964 | United Kingdom | 524/291 |
| 1017432 | 1/1966 | United Kingdom | 524/291 |
| 1331353 | 8/1971 | United Kingdom | |

OTHER PUBLICATIONS

Chemical Abstracts, vol. 95, No. 9, p. 594, (No. 786296). Degradation and Stabilization of Polyolefins Symposium, No. 57, pp. 153–159, 249–253, (1976).

Primary Examiner—Paul R. Michl
Assistant Examiner—N. Sarofim
Attorney, Agent, or Firm—Sherman & Shalloway

[57] ABSTRACT

A resin composition comprising a poly-1-butene polymer and at least one hindered phenol selected from the group consisting of (a) 3,5-di-tert-butyl-4-hydroxybenzoates of the following formula

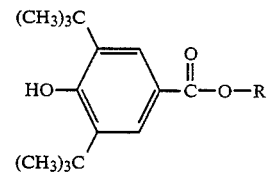

wherein R represents an alkyl group having 1 to 18 carbon atoms or an aryl group having 6 to 18 carbon atoms, (b) 1,3,5-trimethyl-2,4,6-tris(3,5-di-tert-butyl-4-hydroxybenzyl)benzene, (c) 1,3,5-tris(4-tert-butyl-3-hydroxy-2,6-dimethylbenzyl)isocyanurate, (d) tris(3,5-di-tert-butyl-4-hydroxybenzyl)isocyanurate, (e) n-octadecyl-3-(3,5-di-tert-butyl-4-hydroxyphenyl)propionate, (f) a nickel salt of a monoethyl ester of bis(3,5-di-tert-butyl-4-hydroxybenzylphosphonic acid), (g) 2,2'-dihydroxy-3,3'-di(α-methylcyclohexyl)-5,5'-dimethyl-diphenylmethane, (h) 4,4'-thiobis(3-methyl-6-tert-butyl-phenol), (i) 1,1,3-tris(2-methyl-4-hydroxy-5-tert-butyl-phenyl)butane, (j) tetrakis[methylene-3-(3,5-di-tert-butyl-4-hydroxyphenyl)propionate]methane, and (k) 4,4'-methylene-bis(2,6-di-tert-butyl-phenol), and further optionally, at least one compound selected from the group consisting of (l) 2,6-tert-butyl-p-cresol, (m) tris(2,4-di-tert-butyl-phenol)phosphite, and (n) tocopherol.

15 Claims, No Drawings

POLY-1-BUTENE RESIN COMPOSITION

This invention relates to a poly-1-butene resin composition. More specifically, it relates to a poly-1-butene resin composition having excellent resistance and pressure-resistant strength against cold or hot water having sterilizing chlorine dissolved therein.

Metallic pipes such as zinc-placed steel pipes, copper pipes and lead pipes have heretofore been used as pipes for supplying cold or hot water. The steel pipes have the defect that rust is formed to generate red or black water. The copper pipes have the defect that pin holes are generated owing to electrolytic corrosion, or blue water occurs as a result of rust formation. Hence, new piping materials have been desired. To some extent, plastic pipes such as pipes made of polyvinyl chloride, polyethylene and poly-1-butene which do not develop rust or pinholes owing to electrolytic corrosion have already come into practical use. In particular, poly-1-butene is now evaluated as one of the most suitable resins for water supply pipes because of its excellent pressure-resistant strength, internal pressure creep durability at high temperatures, high and low temperature properties, abrasion resistance, and flexibility.

Like other synthetic resins, poly-1-butene also undergoes chemical degradation under the action of sterilizing chlorine added to city water, and tends to lose its inherent high performance. This tendency becomes especially pronounced in hot water supply pipes which are placed under high-temperature and high-pressure loads.

To the best of the knowledges of the present inventors, there has not been known a poly-1-butene resin composition having excellent resistance (to be referred to as chlorine water resistance) to cold or hot water containing sterilizing chlorine dissolved therein (to be referred to as chlorine water) and excellent pressure-resistant strength.

It is an object of this invention therefore to provide a poly-1-butene resin composition having excellent chlorine water resistance.

Another object of this invention is to provide a poly-1-butene resin composition having excellent chlorine water resistance and excellent pressure resistance in the state of being in contact with chlorine water (to be referred to simply as pressure resistance).

Still another object of this invention is to provide a poly-1-butene resin composition which has excellent surface luster and shows only a small extent of decrease in the degree of polymerization of the poly-1-butene polymer when it is kept in contact with chlorine water for a long period of time.

A further object of this invention is to provide a poly-1-butene resin composition having excellent chlorine water resistance and pressure resistance which is suitable for use as a material for pipes used to supply cold or hot water having a minor amount of sterilizing chlorine dissolved therein.

Other objects and advantages of this invention will become apparent from the following description.

The objects and advantages of this invention are achieved by a resin composition comprising a poly-1-butene polymer and at least one hindered phenol selected from the group consisting of (a) 3,5-di-tert-butyl-4-hydroxybenzoates of the following formula

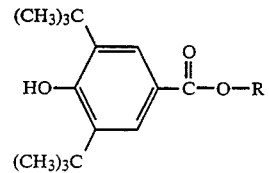

wherein R represents an alkyl group having 1 to 18 carbon atoms or an aryl group having 6 to 18 carbon atoms, (b) 1,3,5-trimethyl-2,4,6-tris(3,5-di-tert-butyl-4-hydroxybenzyl)benzene,
(c) 1,3,5-tris(4-tert-butyl-3-hydroxy-2,6-dimethylbenzyl)isocyanurate,
(d) tris(3,5-di-tert-butyl-4-hydroxybenzyl)isocyanurate,
(e) n-octadecyl-3-(3,5-di-tert-butyl-4-hydroxyphenyl)-propionate,
(f) a nickel salt of a monoethyl ester of bis(3,5-di-tert-butyl-4-hydroxybenzylphosphonic acid),
(g) 2,2'-dihydroxy-3,3'-di(α-methylcyclohexyl)-5,5'-dimethyl-diphenylmethane,
(h) 4,4'-thiobis(3-methyl-6-tert-butyl-phenyl),
(i) 1,1,3-tris(2-methyl-4-hydroxy-5-tert-butyl-phenyl)-butane,
(j) tetrakis[methylene-3-(3,5-di-tert-butyl-4-hydroxyphenyl)propionate]methane, and
(k) 4,4'-methylene-bis(2,6-di-tert-butyl-phenol).

The hindered phenols (a) to (k) used in the present invention are compounds known as antioxidants or ultraviolet absorbers.

Investigations of the present inventors have shown that while very many hindered phenols have been known heretofore, only the above-specified compounds (a) to (k) can improve the chlorine water resistance or pressure resistance of poly-1-butene polymer to a fully satisfactory degree and other hindered phenols are useless for this purpose, although no clear reason has yet been assigned to it.

The specific structures of the hindered phenols (a) to (k) used in this invention are shown below.

(a) 3,5-Di-tert-butyl-4-hydroxybenzoates

These compounds are represented by the following formula (I).

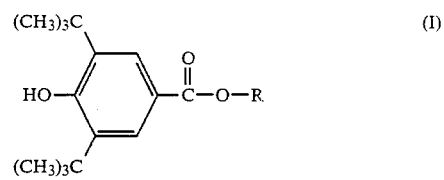

wherein R represents an alkyl group having 1 to 18 carbon atoms or an aryl group having 6 to 18 carbon atoms.

In formula (I) above, the $C_1$–$C_{18}$ alkyl group may be linear or branched, and includes, for example, methyl, ethyl, propyl, butyl, pentyl, hexyl, heptyl, octyl, nonyl, decyl, undecyl, dodecyl, hexadecyl and octadecyl. Examples of the $C_6$–$C_{18}$ aryl group are phenyl, naphthyl and diphenyl or alkyl-substituted aryl groups resulting from the substitution of the above aryl groups by 1, 2 or 3 alkyl groups having 1 to 12 carbon atoms provided that the total number of carbon atoms in the substituted aryl groups does not exceed 18. Specific examples of the alkyl-substituted aryl groups are 3,5-di-tert-butylphenyl, 2,6-di-tert-butylphenyl, 2,4-di-tert-butylphenyl, 2,4,6-tri-tert-butylphenyl, 2,6-dimethylphenyl, and 2,6-di-tert-butyl-4-methylphenyl.

Thus, examples of the 3,5-di-tert-butyl-4-hydroxybenzoates of formula (I) include methyl 3,5-di-tert-butyl-4-hydroxybenzoate, propyl 3,5-di-tert-butyl-4-hydroxybenzoate, octyl 3,5-di-tert-butyl-4-hydroxybenzoate, dodecyl 3,5-di-tert-butyl-4-hydroxybenzoate, hexadecyl 3,5-di-tert-butyl benzoate, 3,5-di-tert-butylphenyl 3,5-di-tert-butyl-4-hydroxybenzoate, 2,6-di-tert-butylphenyl 3,5-di-tert-butyl-4-hydroxybenzoate, 2,4,6-tri-tert-butylphenyl 3,5-di-tert-butyl-4-hydroxybenzoate, 2,4-di-tert-butylphenyl 3,5-di-tert-butyl-4-hydroxybenzoate, and 2,6-dimethylphenyl 3,5-di-tert-butyl-4-hydroxybenzoate.

(b) 1,3,5-Trimethyl-2,4,6-tris(3,5-di-tert-butyl-4-hydroxybenzyl)benzene

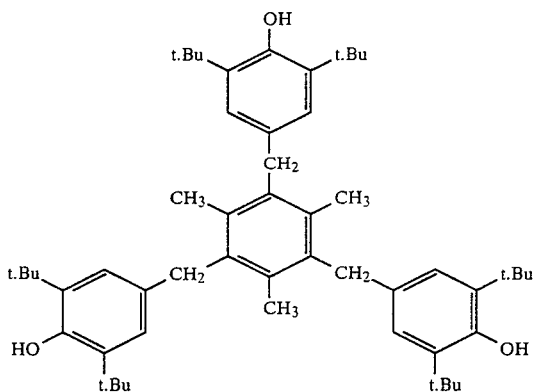

(In the above and subsequent formulae, t.Bu represents a tert-butyl group.

(c) 1,3,5-tris(4-tert-Butyl-3-hydroxy-2,6-dimethylbenzyl)isocyanurate

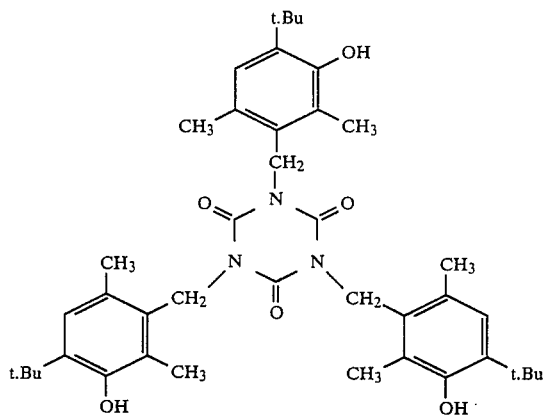

(d) tris(3,5-Di-tert-butyl-4-hydroxybenzyl)isocyanurate

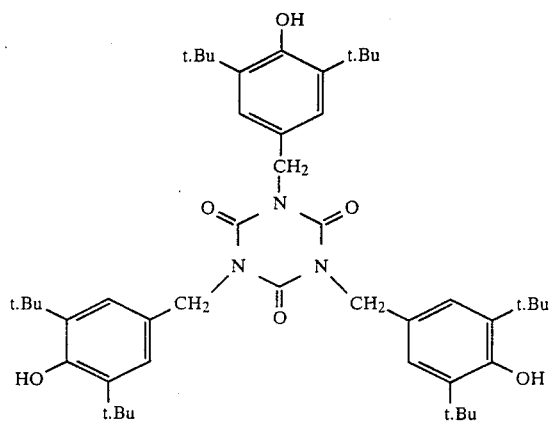

(e) n-Octadecyl 3-(3,5-di-tert-butyl-4-hydroxyphenyl)-propionate

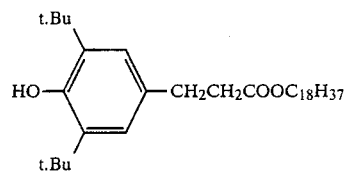

(f) Nickel salt of a monoethylester of bis(3,5-di-tert-butyl-4-hydroxybenzylphosphonic acid)

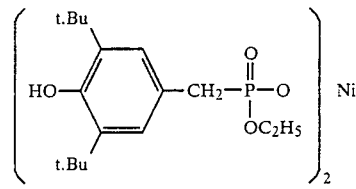

(g) 2,2'-dihydroxy-3,3'-di(α-methylcyclohexyl)-5,5'-dimethyl-diphenylmethane

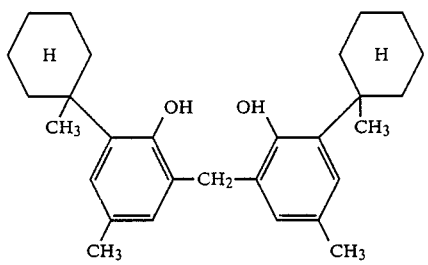

(h) 4,4'-Thiobis(3-methyl-6-tert-butylphenol)

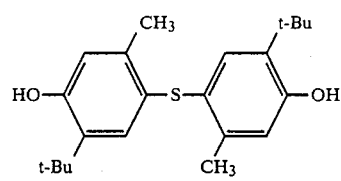

(i) 1,1,3-Tris(2-methyl-4-hydroxy-5-tert-butyl-phenyl)-butane

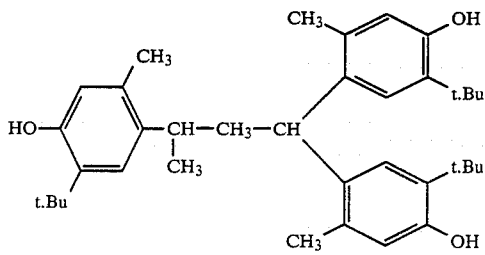

(j) Tetrakis[methylene-3-(3,5-di-tert-butyl-4-hydroxyphenyl)propionate]methane

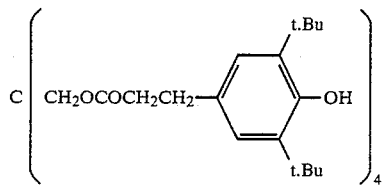

(k) 4,4'-Methylenebis(2,6-di-tert-butylphenol)

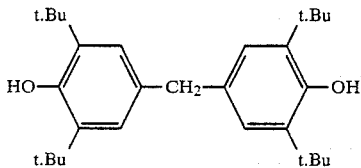

The poly-1-butene polymer used in this invention is preferably a homopolymer of 1-butene, a copolymer of at least 90 mole % of 1-butene and not more than 10 mole% of another α-olefin, or a mixture of at least 50% by weight of the above homopolymer or copolymer with not more than 50% by weight of another α-olefin polymer. Examples of α-olefins other than 1-butene are ethylene, propylene, 4-methyl-1-pentene, 1-hexene and 1-octene. The poly-1-butene polymer used in this invention especially preferably has a melt flow rate (to be abbreviated MFR) of 0.1 to 50 g/10 minutes (measured in accordance with ASTM D-1238N). The poly-1-butene polymers used in this invention and methods for their manufacture are described, for example, in the specifications of U.S. Pat. Nos. 3,197,452, 3,219,645, 3,362,940, 3,244,685, 3,356,666, 3,907,761 and 3,865,902. The descriptions of these specifications are therefore incorporated herein as part of the specification of the present application.

The poly-1-butene resin composition of this invention may contain 100 parts by weight of the poly-1-butene polymer and usually 0.05 to 2.0 parts by weight, preferably 0.1 to 1.0 part by weight, of at least one hindered phenol selected from the group consisting of (a) to (k) above. If the content of the hindered phenol is lower than the above-specified lower limit, the extent of improvement of the chlorine water resistance of the poly-1-butene resin composition tends to be considerably small.

A group of the hindered phenols (a) to (k) used in this invention give poly-1-butene resin compositions having improved chlorine water resistance and pressure-resistant strength. Investigations of the present inventors have shown the above hindered phenols to be excellent in that the 3,5-di-tert-butyl-4-hydroxybenzoate (a) give the poly-1-butene resin composition of the invention which undergoes little degradation at its surface of contact with chlorine water when kept in contact with chlorine water, and the hindered phenols (b) to (k) give the poly-1-butene resin composition which has a relatively high degree of polymerization and little decreases in its degree of polymerization when kept in contact with chlorine water. In Examples given hereinbelow, the degradation of the contacting surface is evaluated by measuring the gloss of the resin surface, and the degree of polymerization, by measuring the solution viscosity of the resin composition.

Preferably, the resin composition of this invention contains at least one 3,5-di-tert-butyl-4-hydroxybenzoate (a) and at least one of the hindered phenols (b) to (k).

The resin composition of this invention desirably contains at least one of compounds (l) to (n) shown below.

(l) 2,6-di-tert-butyl-p-cresol

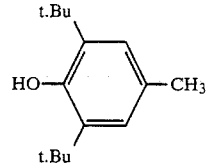

(m) tris(2,4-di-tert-butyl-phenyl)phosphite

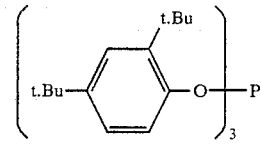

(n) tocopherol(α-, β-, γ- or δ-tocopherol, or a mixture of these)

The resin composition of this invention further containing at least one of the compounds (l) to (n) is superior in that it has a higher degree of polymerization than the resin composition of this invention not containing these compounds. The compounds (l) to (n) effectively prevent the poly-1-butene polymer from being degraded in the molten state by oxygen and heat when it is mixed with the hindered phenols (a) to (k). The resin composition of this invention which further contains at least one compound from the group of (l) to (n) contains at least one of (l) to (n) in an amount of usually 0.01 to 1.0 part by weight, preferably 0.05 to 0.5 part by weight, per 100 parts by weight of the poly-1-butene polymer. When the content of the compound (l) to (n) is less than 0.01 part by weight, scarcely any effect is obtained of incorporating such a compound (l) to (n). If, on the other hand, it exeeds 1.0 part by weight, there is a tendency to the formation of a resin composition having a reduced tensile yield stress.

According to this invention, the resin composition further containing at least one of the compounds (l) to (n) preferably comprises at least one of the 3,5-di-tert-butyl-4-hydroxybenzoates (a), at least one hindered phenol selected from the group consisting of the compounds (b) to (k) and at least one compound selected from the group of (l) to (n); or the compound (b), the compound (e), the compound (j) and at least one compound selected from the group of (l) to (n).

The aforesaid preferred resin compositions of this invention have improved chlorine water resistance both at the surface portion of a shaped article and at the entire portion of a shaped article of resin, and exhibit reduced degradation of the polymer during molding.

Various known methods can be used to mix the poly-1-butene polymer with the compounds (a) to (n). For example, the individual ingredients are mixed by a ribbon blender or a Henschel mixer and then granulated by an extruder. Or they may be directly melted and mixed by a Banbury mixer, a kneader, a two-roll mill, etc. and then granulated by an extruder.

As required, other ultraviolet absorbers, moldproof agents, rust inhibitors, lubricants, fillers, pigments, dyes, heat stabilizers, etc. may be incorporated in the poly-1-butene resin composition of this invention. Rust formation on melting and processing machines caused by the catalyst residue can be conveniently inhibited by using as the rust inhibitors a metal salt of a higher fatty acid, or a double compound of the general formula $$M_xAl_y(OH)_{2x+3y-2z}(A)_z \cdot aH_2O$$

wherein M represents Mg, Ca or Zn, A represents a divalent anion, x, y and z are positive numbers, and a is 0 or a positive number.

Since the resin composition of this invention has excellent chlorine water resistance and pressure-resistant strength, it can be conveniently used as a material for pipe systems adapted for supplying water having chlorine dissolved therein, for example tap water, or non-potable industrial water sterilized with chlorine.

A water supply pipe may be molded from the poly-1-butene resin composition of this invention by, for example, melting the poly-1-butene polymer having incorporated therein at least one compound selected from (a) to (n) at a temperature of 150° to 300° C. in an extruder, extruding the molten mixture through a die, sizing the extrudate, cooling the extrudate with cooling water at a temperature of 5° to 50° C., and cutting or winding up the cooled product through a take-up device. The extruder may generally be a single-screw metering type extruder. The die may, for example, be of a straight head type, a cross head type or an offset type. The sizing may be carried out by a sizing plate method, an outside mandrel method, a sizing box method or an inside mandrel method. A pipe coupling joint may be molded by using a combination of an ordinary injection molding machine and a mold or a combination of a blow molding machine and a mold, and a hot water storage tank may be molded by using a combination of a blow molding machine and a mold.

The poly-1-butene resin composition of this invention can be used widely in cold and hot-water supply systems because it has improved chlorine water resistance while retaining superior pressure-resistant strength, internal pressure creep durability at high temperatures, high and low temperature properties and abrasion resistance inherent to the poly-1-butene polymer.

The following examples illustrate the present invention in greater detail.

EXAMPLE 1

One hundred parts by weight of poly-1-butene (MFR 0.8 g/10 min.; ASTM D-1238N); manufactured by Mitsui Petrochemical Industries, Ltd.), 0.15 part by weight of calcium stearate, 0.05 part by weight of synthetic hydrotalcite (DHT-4A, a tradename) and 0.4 part by weight of each of the compounds shown in Table 1 were mixed in a Henschel mixer, melted and extruded at 230° C. and then granulated by an extruder having a screw diameter of 20 mm. The resulting pellets were melted for 10 minutes by a hot press at 200° C., and then pressed by a cold press at 30° C. for 3 minutes to form a press sheet having a thickness of 1 mm. Test pieces, 10 mm × 150 mm in size, were cut off from the press sheet. Each test piece was set on a holder, and dipped in a vessel in which chlorine containing water having an effective chlorine concentration of 100 ppm and a temperature of 90° C. was passed at a rate of 1 liter/hour. The gloss (angle of incident light 45°) and [η] (in decalin at 135° C.) of each test piece with the lapse of time were measured.

Immediately after molding, all test pieces had a gloss in the range of 90 to 95%. The results are summarized in Table 1.

TABLE 1

| Run No. | Compound incorporated | Gloss (%) In the 4th week | Gloss (%) In the 8th week | [η] (dl/g) Initial value | [η] (dl/g) In the 8th week |
|---|---|---|---|---|---|
| 1 | (a)-1 | 85 | 76 | 3.2 | 1.7 |
| 2 | (a)-2 | 80 | 70 | 3.1 | 1.5 |
| 3 | (b) | 35 | 6 | 4.2 | 3.2 |
| 4 | (c) | 30 | 5 | 4.5 | 3.6 |
| 5 | (d) | 25 | 6 | 3.8 | 2.9 |
| 6 | (e) | 29 | 6 | 4.1 | 3.0 |
| 7 | (f) | 76 | 8 | 4.6 | 3.6 |
| 8 | (g) | 23 | 5 | 4.6 | 3.5 |
| 9 | (h) | 23 | 6 | 4.2 | 3.4 |
| 10 | (i) | 60 | 6 | 3.7 | 2.9 |
| 11 | (j) | 9 | 5 | 4.3 | 2.8 |
| 12 | (k) | 45 | 12 | 4.7 | 1.0 |
| 13 | (l) | 57 | 25 | 4.6 | 3.4 |
| 14 | (m) | 25 | 5 | 4.6 | 0.8 |
| 15 | (n) | 70 | 10 | 4.5 | 1.0 |

In the table, compound (a)-1 is 2,4-di-tert-butylphenyl 3,5-di-tert-butyl-4-hydroxybenzoate, and compound (a)-2 is n-hexadecyl-di-tert-butyl-4-hydroxybenzoate.

The compounds used in the above experiments were all commercially available compounds which are shown by tradenames as follows:

(a)-1: Tinuvin 120
(a)-2: Cyasorb UV-2908
(b): Irganox 1330
(c): Syanox 1790
(d): Goodrite 3114
(e): Irganox 1076
(f): Irgastab 2002
(g): Nonox WSP
(h): Santonox R
(i): Topanol CA
(j): Irganox 1010
(k): Antioxidant 702
(l): BHT
(m): Irgaphos 168
(n): vitamin E

COMPARATIVE EXAMPLES 1 TO 5

Example 1 was repeated except that each of the compounds indicated in Table 2 was used instead of each of the compounds indicated in Table 1. The results are shown in Table 2.

TABLE 2

| Comparative Example | Compound incorporated | Gloss (%) In the 4th week | Gloss (%) In the 8th week | [η] (dl/g) Initial value | [η] (dl/g) In the 8th week |
| --- | --- | --- | --- | --- | --- |
| 1 | Not added | 7 | 5 | 1.9 | 0.4 |
| 2 | p | 6 | 5 | 2.8 | 0.6 |
| 3 | q | 8 | 5 | 2.6 | 0.7 |
| 4 | r | 6 | 5 | 3.3 | 0.6 |
| 5 | s | 6 | 5 | 3.7 | 1.6 |

Note:
p: 2-(2-hydroxy-3-tert-butyl-5-methylphenyl)-5-chlorobenzotriazole
q: bis(2,2,6,6-tetramethyl-4-piperidyl)sebacate
r: distearyl thiodipropionate
s: pentaerythritol tetra(β-laurylthiopropionate

EXAMPLES 2 TO 4

Example 1 was repeated except that 0.2 part by weight of each of the compounds indicated in Table 3 was used instead of 0.4 part by weight of each of the compounds indicated in Table 1. The results are shown in Table 3.

TABLE 3

| Example | Compound incorporated | Gloss (%) In the 4th week | Gloss (%) In the 8th week | [η] (dl/g) Initial value | [η] (dl/g) In the 8th week |
| --- | --- | --- | --- | --- | --- |
| 2 | (a)-1 and (b) | 90 | 81 | 4.0 | 3.0 |
| 3 | (a)-2 and (c) | 90 | 80 | 4.2 | 3.1 |
| 4 | (b) and (k) | 89 | 35 | 4.6 | 3.5 |

The compounds indicated in Table 3 were commercially available under the tradenames shown below Table 1.

EXAMPLES 5 TO 9

Example 1 was repeated except that 0.2 part by weight of each of the compounds indicated in Table 4 was used instead of 0.4 part by weight of each of the compounds indicated in Table 1. The results are shown in Table 4.

TABLE 4

| Example | Compound incorporated | Gloss (%) In the 4th week | Gloss (%) In the 8th week | [η] (dl/g) Initial value | [η] (dl/g) In the 8th week |
| --- | --- | --- | --- | --- | --- |
| 5 | (a)-1, (f) and (m) | 90 | 90 | 4.8 | 4.4 |
| 6 | (a)-1, (b) and (k) | 90 | 90 | 4.7 | 4.3 |
| 7 | (a)-1, (b) and (n) | 90 | 90 | 4.7 | 4.3 |
| 8 | (a)-1, (b) and (m) | 90 | 90 | 4.8 | 4.2 |
| 9 | (a)-1, (b) and (l) | 90 | 90 | 4.8 | 4.2 |

The compounds indicated in Table 4 were commercially available under the tradenames indicated below Table 1.

EXAMPLE 10

Example 1 was repeated except that the four compounds indicated in Table 5 were used in the indicated amounts instead of 0.4 part by weight of each of the compounds shown in Table 1. The results are shown in Table 5.

TABLE 5

| Compounds (parts by weight) | Gloss (%) In the 4th week | Gloss (%) In the 8th week | [η] (dl/g) Initial value | [η] (dl/g) In the 8th week |
| --- | --- | --- | --- | --- |
| (b) (0.3) (e) (0.3) (j) (0.3) (l) (0.1) | 85 | 65 | 4.6 | 4.4 |

What is claimed is:

1. A cold or hot water supplying pipe capable of supplying cold or hot water containing sterilizing chlorine dissolved therein, said pipe being composed of a resin composition comprising a poly-1-butene polymer and at least one hindered phenol selected from the group consisting of
    (a) 3,5-di-tert-butyl-4-hydroxybenzoates of the following formula

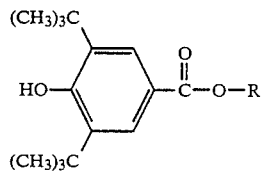

wherein R represents an alkyl group having 1 to 18 carbon atoms or an aryl group having 6 to 18 carbon atoms;
    (b) 1,3,5-trimethyl-2,4,6-tris(3,5-di-tert-butyl-4-hydroxybenzyl)benzene,
    (c) 1,3,5-tris(4-tert-butyl-3-hydroxy-2,6-dimethylbenzyl)isocyanurate,
    (d) tris(3,5-di-tert-butyl-4-hydroxybenzyl)isocyanurate,
    (e) n-octadecyl-3-(3,5-di-tert-butyl-4-hydroxyphenyl)propionate,
    (f) a nickel salt of a monoethyl ester of bis(3,5-di-tert-butyl-4-hydroxybenzylphosphonic acid),
    (g) 2,2'-dihydroxy-3,3'-di(α-methylcyclohexyl)-5,5'-di-methyl-diphenylmethane,
    (h) 4,4'-thiobis(3-methyl-6-tert-butyl-phenol),
    (i) 1,1,3-tris(2-methyl-4-hydroxy-5-tert-butylphenyl)butane,
    (j) tetrakis(methylene-3-(3,5-di-tert-butyl-4-hydroxyphenyl)propionate)methane, and
    (k) 4,4'-methylene-bis(2,6di-tert-butyl-phenol) Ain an amount effective to provide said polymer with resistance to chemical degradation from the effects of said sterilizing chlorine.

2. The cold or hot water supplying pipe of claim 1 wherein the resin composition further comprises at least one compound selected from the group consisting of
    (l) 2,6-tert-butyl-p-cresol,
    (m) tris(2,4-di-tert-butyl-phenol)phosphite, and
    (n) tocopherol.

3. The cold or hot water supplying pipe of claim 2 wherein the resin composition comprises the poly-1-butene polymer and at least one of the 3,5-di-tert-butyl-4-hydroxybenzoates (a), at least one hindered phenol selected from the group consisting of the compounds (b) to (j) and at least one compound selected from the group consisting of the compounds (k) to (n).

4. The cold or hot water supplying pipe of claim 1 wherein the resin composition comprises the compounds (b), (e) and (j) and at least one compound selected from the group consisting of (l) 2,6-tert-butyl-p-cresol, (m) tris(2,4-di-tert-butyl-phenol)phosphite, and (n) tocopherol.

5. A method for providing a poly-1-butene resin composition with chlorine water-resistance and pressure-resistance for both cold and hot water having a minor amount of sterilizing chlorine dissolved therein, said method comprising incorporating in said poly-1-butene resin composition a stabilizing effective amount of at least one hindered phenol selected from the group consisting of (a) 3,5-di-tert-butyl-4-hydroxybenzoates of the following formula

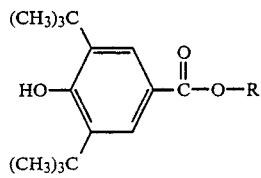

wherein R represents an alkyl group having 1 to 18 carbon atoms or an aryl group having 6 to 18 carbon atoms;

(b) 1,3,5-trimethyl-2,4,6-tris(3,5-di-tert-butyl-4-hydroxybenzyl)benzene, (c) 1,3,5-tris(4-tert-butyl-3-hydroxy-2,6-dimethylbenzyl)isocyanurate, (d) tris(3,5-di-tert-butyl-4-hydroxybenzyl)isocyanurate, (e) n-octadecyl-3-(3,5-di-tert-butyl-4-hydroxyphenyl)propionate, (f) a nickel salt of a monoethyl ester of bis(3,5-di-tert-butyl-4-hydroxybenzylphosphonic acid), (g) 2,2'-dihydroxy-3,3'-di(α-methylcyclohexyl)-5,5'-di-methyl-diphenylmethane, (h) 4,4'-thiobis(3-methyl-6-tert-butyl-phenol), (i) 1,1,3-tris(2-methyl-4-hydroxy-5-tert-butyl-phenyl)butane, (j) tetrakis(methylene-3-(3,5-di-tert-butyl-4-hydroxyphenyl)propionate)methane, and (k) 4,4'-methylene-bis(2,6-di-tert-butyl-phenol) in an amount effective to provide said polymer with resistance to chemical degradation from the effects of said sterilizing chlorine.

6. A method for supplying cold or hot water having a minor amount of sterilizing chlorine dissolved therein in a pipe composed of a poly-1-butene resin composition which pipe maintains its surface luster and exhibits only a small amount of decrease in the degree of polymerization of the poly-1-butene polymer when kept in contact with the chlorine-containing water for long periods of time, wherein a stabilizing effective amount of at least one hindered phenol selected from the group consisting of (a) 3,5-di-tert-butyl-4-hydroxybenzoates of the following formula

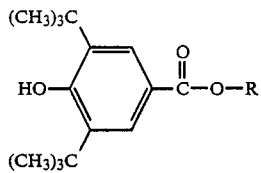

wherein R represents an alkyl group having 1 to 18 carbon atoms or an aryl group having 6 to 18 carbon atoms;

(b) 1,3,5-trimethyl-2,4,6-tris(3,5-di-tert-butyl-4-hydroxybenzyl)benzene, (c) 1,3,5-tris(4-tert-butyl-3-hydroxy-2,6-dimethylbenzyl)isocyanurate, (d) tris(3,5-di-tert-butyl-4-hydroxybenzyl)isocyanurate, (e) n-octadecyl-3-(3,5-di-tert-butyl-4-hydroxyphenyl)propionate, (f) a nickel salt of a monoethyl ester of bis(3,5-di-tert-butyl-4-hydroxybenzylphosphonic acid), (g) 2,2'-dihydroxy-3,3'-di(α-methylcyclohexyl)-5,5'-di-methyl-diphenylmethane, (h) 4,4'-thiobis(3-methyl-6-tert-butyl-phenol), (i) 1,1,3-tris(2-methyl-4-hydroxy-5-tert-butyl-phenyl)butane, (j) tetrakis(methylene-3-(3,5-di-tert-butyl-4-hydroxyphenyl)propionate)methane, and (k) 4,4'-methylene-bis(2,6-di-tert-butyl-phenol) in an amount effective to provide said polymer with resistance to chemical degradation from the effects of said sterilizing chlorine is incorporated in the poly-1-butene polymer.

7. The cold or hot water supplying pipe of claim 3 wherein the poly-1-butene polymer is a homopolymer of 1-butene, a copolymer of at least 90 mole% of 1-butene and not more than 10 mole% of another alpha-olefin, or a mixture of at least 50% by weight of said homopolymer or copolymer with not more than 50% by weight of another alpha-olefin.

8. The cold or hot water supplying pipe of claim 3 which comprises 0.05 to 2.0 parts by weight of at least one additional said hindered phenol selected from the group consisting of (b) to (j) per 100 parts by weight of the poly-1-butene polymer.

9. The cold or hot water supplying pipe of claim 3 which comprises 0.01 to 1.0 part by weight of at least one compound selected from the group consisting of (k) to (n) per 100 parts by weight of the poly-1-butene polymer.

10. The cold or hot water supplying pipe of claim 3 which comprises 0.05 to 2.0 parts by weight of at least one said compound (a).

11. The cold or hot water supplying pipe of claim 3 which comprises, per 100 parts by weight of the poly-1-butene polymer 0.05 to 2.0 parts by weight of at least one said hindered phenol (a), 0.05 to 2.0 parts by weight of at least one additional said hindered phenol selected from the group consisting of the compounds (b) to (j), and 0.01 to 1.0 part by weight of at least one said compound selected from the group consisting of (k) to (n).

12. The cold or hot water supplying pipe of claim 11 wherein the poly-1-butene polymer is a homopolymer of 1-butene, a copolymer of at least 90 mole% of 1-butene and not more than 10 mole% of another alpha-olefin, or a mixture of at least 50% by weight of said homopolymer or copolymer with not more than 50% by weight of another alpha-olefin.

13. A cold or hot water supplying pipe comprising a poly-1-butene polymer, (b) 1,3,5-trimethyl-2,4,6-tris(3,5-di-tert-butyl-4-hydroxybenzyl)benzene, (e) n-octadecyl-3-(3,5-di-tert-butyl-4-hydroxyphenyl)propionate, (j) tetrakis(methylene-3-(3,5-di-tert-butyl-4-hydroxyphenyl)propionate)methane, and at least one compound selected from the group consisting of (l)

2,6-tert-butyl-p-cresol, (m) tris(2,4-di-tert-butylphenol)phosphite, and (n) tocopherol.

14. The cold or hot water supplying pipe of claim 13 wherein the poly-1-butene polymer is a homopolymer of 1-butene, a copolymer of at least 90 mole% of 1-butene and not more than 10 mole% of another alpha-olefin, or a mixture of at least 50% by weight of said homopolymer or copolymer with not more than 50% by weight of another alpha-olefin.

15. The cold or hot water supplying pipe of claim 13 which comprises, per 100 parts by weight of the poly-1-butene polymer, 0.05 to 2.0 parts by weight of each of the compound (b), the compound (e) and the compound (j) and 0.01 to 1.0 part by weight of at least one of said compounds (l) to (n).

* * * * *

UNITED STATES PATENT AND TRADEMARK OFFICE
CERTIFICATE OF CORRECTION

PATENT NO. : 4,532,165
DATED : July 30, 1985
INVENTOR(S) : Takashi Hashimoto, et al It is certified that error appears in the above-identified patent and that said Letters Patent is hereby corrected as shown below:

```
Claim 1, Col. 10, line 48, delete "6di" insert --6-di--.
                 line 48, delete "Ain", insert --in--.

Claim 6, Col. 12, line 34, after "phenol", insert --)--.
```

Signed and Sealed this

Twenty-second Day of October 1985

[SEAL]

Attest:

Attesting Officer

DONALD J. QUIGG

Commissioner of Patents and
Trademarks—Designate